(12) United States Patent
Ha et al.

(10) Patent No.: US 8,104,899 B2
(45) Date of Patent: Jan. 31, 2012

(54) BEAM PROJECTION APPARATUS AND METHOD WITH AUTOMATIC IMAGE ADJUSTMENT

(75) Inventors: Tae-Sin Ha, Seoul (KR); Dong-Soo Kim, Gyeonggi-si (KR); Hyun-Sik Shim, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 555 days.

(21) Appl. No.: 12/201,299

(22) Filed: Aug. 29, 2008

(65) Prior Publication Data

US 2009/0059182 A1 Mar. 5, 2009

(30) Foreign Application Priority Data

Aug. 29, 2007 (KR) .................. 10-2007-0087085

(51) Int. Cl.
*G03B 21/14* (2006.01)
(52) U.S. Cl. ............ 353/69; 353/7; 353/30; 353/31; 353/79; 353/70; 353/101; 353/119; 353/121; 353/122; 348/744; 348/745; 348/746; 348/747
(58) Field of Classification Search ........... 353/7, 30, 353/31, 79, 69, 70, 101, 119, 122, 121; 348/744, 348/745, 746, 747; 359/632, 631, 633, 443, 359/446, 448
See application file for complete search history.

(56) References Cited

U.S. PATENT DOCUMENTS

| | | | |
|---|---|---|---|
| 6,422,704 B1* | 7/2002 | Gyoten et al. | 353/122 |
| 6,520,647 B2* | 2/2003 | Raskar | 353/70 |
| 6,695,451 B1* | 2/2004 | Yamasaki et al. | 353/30 |
| 6,877,863 B2* | 4/2005 | Wood et al. | 353/70 |
| 6,962,416 B2* | 11/2005 | Ohara | 353/70 |
| 7,524,070 B2* | 4/2009 | Matsuda et al. | 353/70 |
| 7,549,754 B2* | 6/2009 | Furui | 353/70 |
| 2003/0223048 A1* | 12/2003 | Kimura | 353/70 |
| 2005/0041216 A1* | 2/2005 | Kobayashi | 353/69 |
| 2008/0013053 A1* | 1/2008 | Anson | 353/69 |
| 2009/0027570 A1* | 1/2009 | Fujinawa | 348/744 |

* cited by examiner

*Primary Examiner* — Georgia Y Epps
*Assistant Examiner* — Sultan Chowdhury
(74) *Attorney, Agent, or Firm* — Cha & Reiter, LLC

(57) ABSTRACT

A beam projection apparatus and method with automatic image adjustment. A beam projection apparatus includes an actuator module being operable to move the beam projection apparatus, a beam projector being operable to project images, and a control module being operable to search surrounding structures around the beam projection apparatus and select a plane portion of the surrounding structures as a screen, to control the actuator module to move the beam projection apparatus for image display on the selected plane portion, and to control the beam projector to project the images on the selected plane portion.

21 Claims, 7 Drawing Sheets

BEAM PROJECTION APPARATUS AND METHOD WITH AUTOMATIC IMAGE ADJUSTMENT

CLAIM OF PRIORITY

This application claims the benefit of an earlier application entitled "Beam Projection Apparatus and Method With Automatic Image Adjustment," filed in the Korean Intellectual Property Office on Aug. 29, 2007 and assigned Serial No. 2007-87085, the contents of which are hereby incorporated by reference.

BACKGROUND OF THE INVENTION

1. Field of the Invention

The present invention relates to a beam projection apparatus and method for using the same. More particularly, the present invention is directed to automatic image adjustment of the beam projection apparatus.

2. Description of the Related Art

Generally, beam projection apparatuses are operated by the user manually changing the direction thereof and focusing the lens in order to adjust the condition of images. Meanwhile, most screens for image display are arranged by the user with the user's own hands. When the user wants to see images by using the projector without any screen, he should select by himself a smooth plane suitable for the image display from surrounding structures.

Thus, the user has been able to display images using the conventional projection apparatus only when he moved the projection apparatus and adjusted the focus of the lens for the image adjustment by himself. That is, there has been available no beam projection apparatus or method capable of automatically searching for and selecting the screen suitable for the image display from the surrounding structures and automatically adjusting the direction and angle of image beams to allow the images to be accurately displayed on the selected screen.

Furthermore, most of the conventional screens used were a white color. It was difficult to search for and select a white color screen from the surrounding structures when the user wanted to see images without a screen. In addition, while the focus adjustment of the conventional projection apparatus has been used to adjust the images, a color combination calibration has not been used for the image adjustment.

SUMMARY OF THE INVENTION

Accordingly, the present invention provides a beam projection apparatus and method with automatic image adjustment, which can automatically search for and select a suitable plane (the walls or ceiling) for image display from the surrounding structures and use the selected plane as a screen. Further, a single color plane can be used as such a screen even if its color is not white. In addition, the present invention provides a beam projection apparatus and method that can automatically adjust a direction and an angle of image beams to correct image distortion.

Moreover, the present invention provides a beam projection apparatus and method, which can automatically focus images and automatically correct either image distortion or a color combination of the images according to conditions of a screen.

The beam projection apparatus and method of the present invention can be used when the apparatus and method are applied to a moving robot.

In accordance with an exemplary embodiment of the present invention, there is provided a beam projection apparatus with automatic image adjustment, which includes an actuator module being operable to move the beam projection apparatus, a beam projector being operable to project images, and a control module being operable to search surrounding structures around the beam projection apparatus and select a plane portion of the surrounding structures, to control the actuator module to move the beam projection apparatus for image display on the selected plane portion, and to control the beam projector to project the images on the selected plane portion.

In addition, there is provided a beam projection method with automatic image adjustment, which includes the steps of searching surrounding structures, selecting a plane portion of the searched surrounding structures and moving to a location that allows displaying images on the selected plane portion, projecting image beams and adjusting a direction and an angle of the projected image beams so that the projected image beams are perpendicularly incident on the selected plane portion, focusing a lens through which the projected image beams pass, and detecting the selected plane portion and calibrating colors of the images of the projected image beams projected thereon.

BRIEF DESCRIPTION OF THE DRAWINGS

The above and other features and advantages of the present invention will be more apparent from the following detailed description taken in conjunction with the accompanying drawings, in which:

Figure 5:
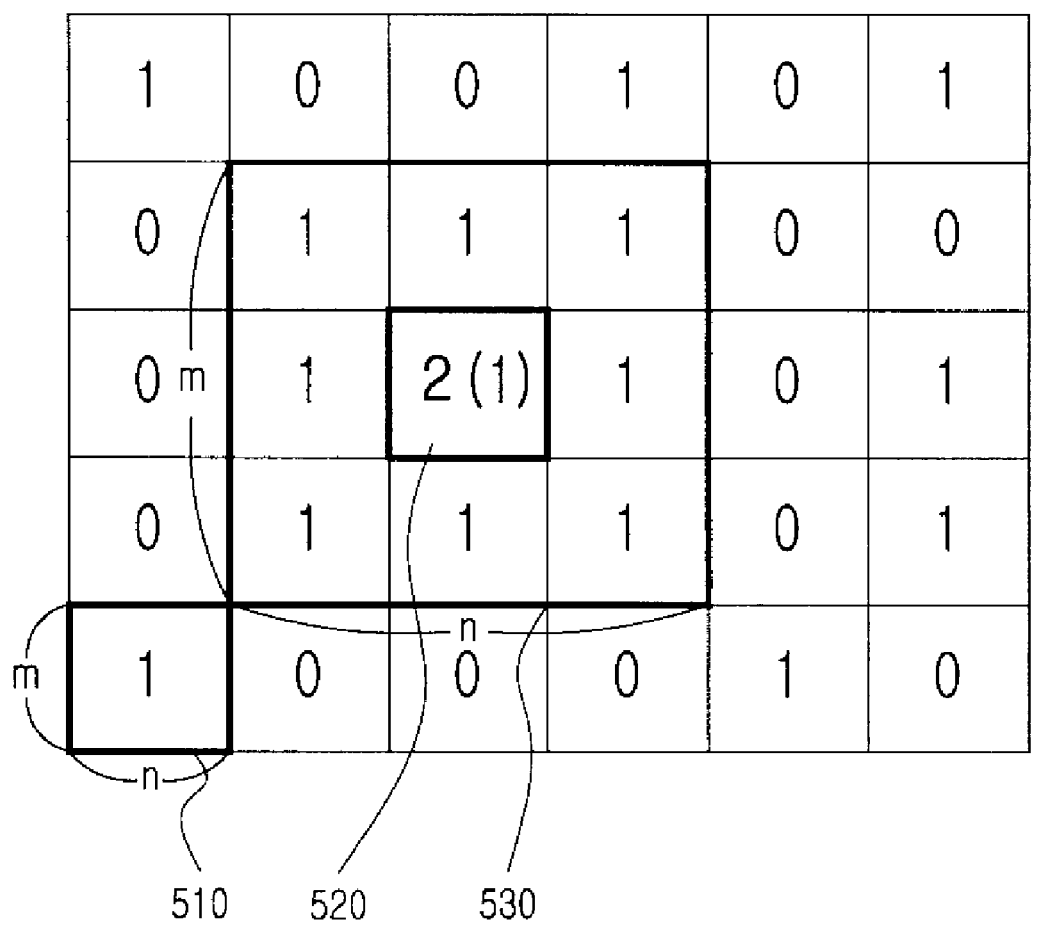

FIG. 5 is a view illustrating an example of a method for selecting a plane portion of the surrounding structures performed by the beam projection apparatus with automatic image adjustment according to an exemplary embodiment of the present invention.

DETAILED DESCRIPTION OF THE INVENTION

Figure 1:
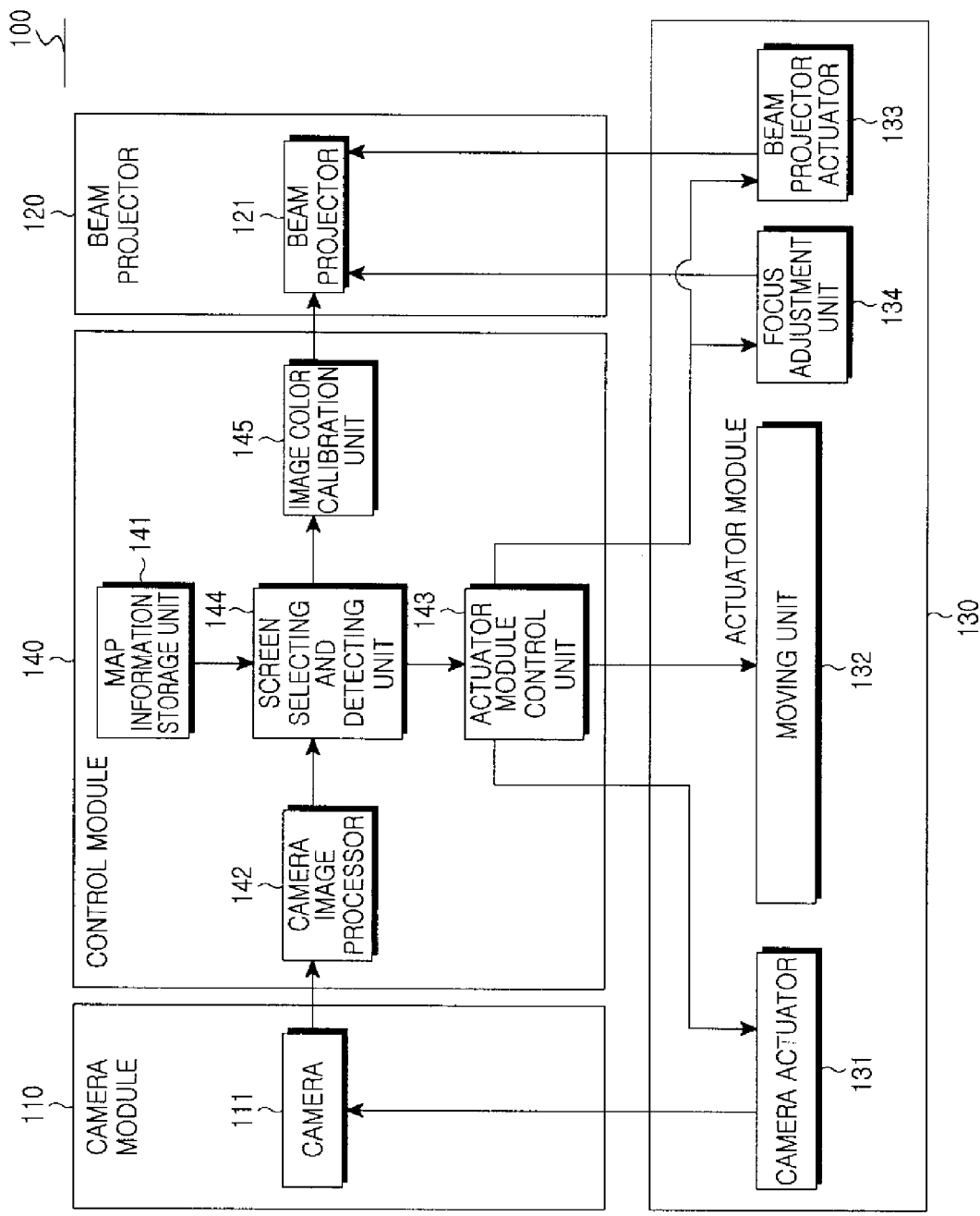
FIG. 1 is a block diagram of a beam projection apparatus with automatic image adjustment according to an exemplary embodiment of the present invention.

Hereinafter, exemplary embodiments of the present invention will be described with reference to the accompanying drawings. In the following description and drawings, the same reference numerals are used to designate the same or similar components. For the purposes of clarity and simplicity, a detailed description of known functions and configurations incorporated herein will be omitted as it may make the subject matter of the present invention unclear.

FIG. 1 is a block diagram of a beam projection apparatus with automatic image adjustment (hereinafter, 'beam projection apparatus' 100) according to an exemplary embodiment of the present invention. FIG. 1 illustrates the connection relationship between components of the beam projection apparatus 100. As shown, the beam projection apparatus 100 includes a camera 110, a beam projector 120, an actuator module 130, and a control module 140. The components will be explained in detail below.

The camera 110 is used to search surrounding structures around the beam projection apparatus 100. The camera 110 finds the most suitable screen from the surrounding structures for image display by the beam projector 120. The surrounding structures are various structures making up the surroundings around a location of the beam projection apparatus 100, such as walls, a ceiling, and a floor. Ultimately, searching the surrounding structures is for the purpose of selecting the most suitable plane as a screen, which allows images not to be distorted when the beam projector 120 projects image beams thereon. Therefore, by selecting and utilizing a plane portion of the surrounding structures as the screen, the beam projection apparatus 100 of the present invention can project images thereon even without a conventional screen. The camera 110 performs a photographing operation in 3-dimensional directions, such as up/down/left/right/forward/backward directions of the beam projection apparatus 100 to take 3-dimensional image data of the surrounding structures. This camera 110 may be implemented as supplementary device additionally connected to the beam projection apparatus 100.

The beam projector 120 is operable to project image beams and thus display images on a screen.

The actuator module 130 is operable to mechanically drive the beam projection apparatus 100 and the components of the beam projection apparatus 100. The actuator module 130 includes a camera actuator 131, a moving unit 132, a focus adjustment unit 134, and a beam projector actuator 133.

The moving unit 132 is operable to move the beam projection apparatus 100 itself in needed directions and to needed locations. This moving unit 132 changes a location and a direction of the beam projection apparatus 100 in order to allow the camera 110 to photograph the surrounding structures in all directions and the beam projector 120 to project image beams on the screen. The moving unit 132 is implemented by a moving means, such as a robot leg or a wheel.

The camera actuator 131 is used to change and adjust a direction and an angle of a lens of the camera 110. The camera actuator 131 can also change a direction and an angle of the camera 110 itself and, ultimately, can determine a photographing direction of the camera 110. In order for the camera 110 to take better pictures of the surrounding structures one of a rotating means capable of rotating in up/down and left/right directions and a moving means capable of moving freely, such as a robot arm, may be used.

The beam projector actuator 133 is used to change and adjust a direction and an angle of image beams projected from the beam projector 120 that are incident on the screen. The image beams should be perpendicularly incident on the screen to correctly display images thereon, i.e., without distortion. In order for the image beams to be perpendicularly incident on the screen one of a rotating means capable of rotating in up/down and left/right directions and a moving means capable of moving freely, such as a robot arm, may also be used as the beam projector actuator 133.

Figure 2:
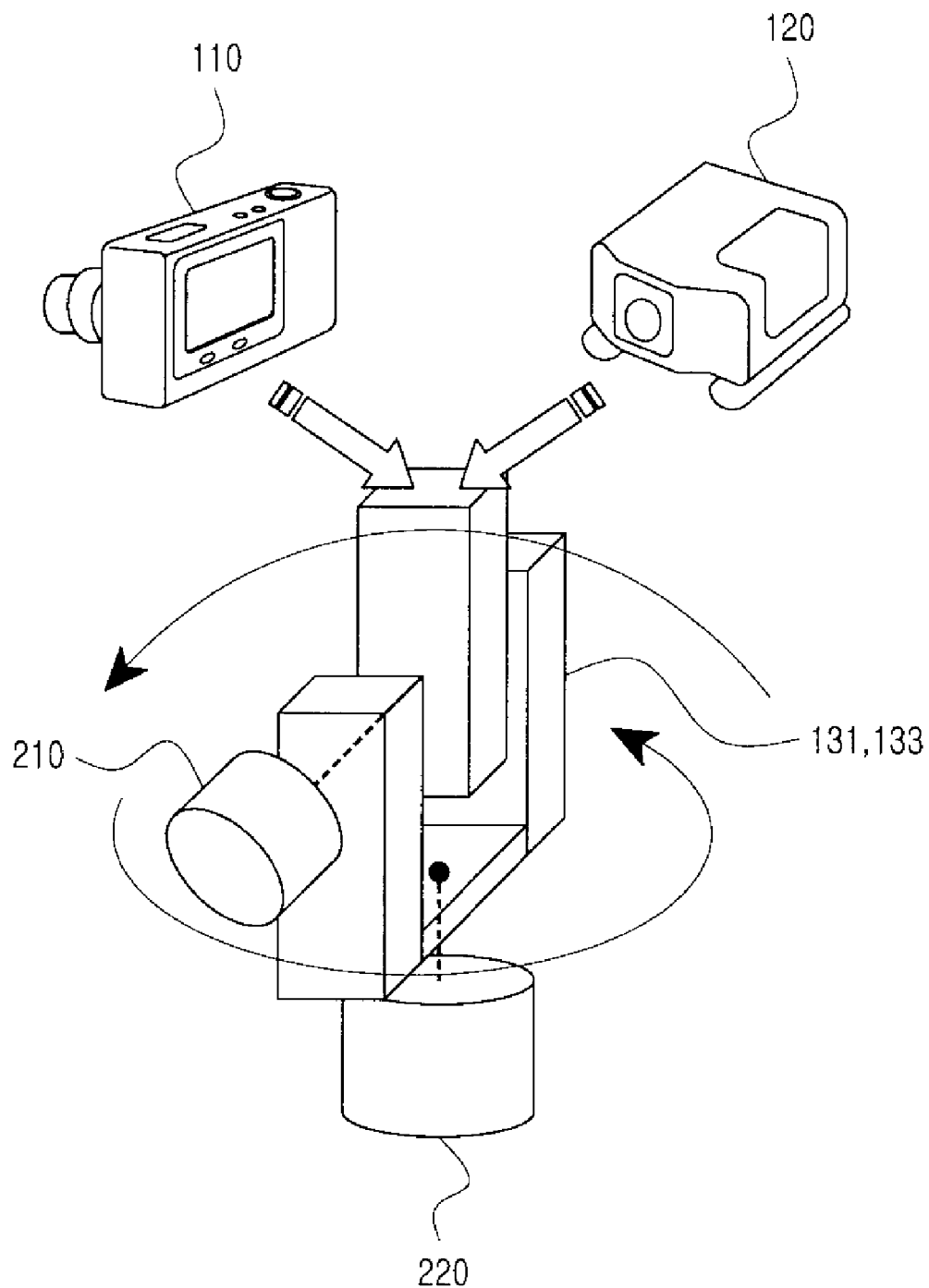
FIG. 2 shows examples of a camera actuator and a beam projector actuator according to an exemplary embodiment of present invention.

On the other hand, the camera actuator 131 and beam projector actuator 133 may be implemented by using one actuating means such as one robot arm. FIG. 2 shows an example according to an exemplary embodiment of present invention in which the camera actuator 131 and the beam projector actuator 133 are implemented by one component to which the camera 110 and the beam projector are to be mounted. Alternatively, these actuators 131 and 133 could be implemented by separate components to which the camera and beam projector are separately attached. The camera actuator 131 and beam projector actuator 133 are mounted to be freely movable in up/down and left/right directions. FIG. 2 illustrates a pitch motion actuator operable to rotate the camera 110 and the beam projector 120 in the up/down direction and a yaw motion actuator operable to rotate the camera 110 and the beam projector 120 in the left/right direction.

The focus adjustment unit 134 is operable to focus the lens by adjusting a position of the lens through which the beams pass. The focus adjustment unit 134 can employ a plurality of modes for focusing. For example, the plurality of modes can be selected from the group consisting of a contrast detection mode, infrared sensor mode, and a hybrid mode. In the contrast detection mode, the high contrast area in a subject is detected. This mode has a drawback in that it is difficult to focus on a subject in the dark or to focus a single color subject with low contrast. In the infrared sensor mode, infrared light is projected to a subject to determine a distance between the camera and the subject. The hybrid mode uses both of the contrast detection mode and the infrared sensor. In addition, other known modes for focusing can be used in the present invention.

The control module 140 is used to control the operations of the components of the beam projection apparatus 100 and includes a map information storage unit 141, a camera image processor 142, an actuator module control unit 143, a screen selecting and detecting unit 144, and an image color calibration unit 145. In addition, though not shown, the beam projection apparatus 100 may include a controller operable to control general operations and functions of the beam projection apparatus 100. The components of the control module 140 will be explained below in detail.

The map information storage unit 141 is used to store 3-dimensional image data of the surroundings and the surrounding structures around the beam projection apparatus. The map information storage unit 141 may have 3-dimensional image data stored thereon which has been previously either taken by the camera 110 or received from other information sources. Both the map information storage unit 141 and the camera 110 mentioned above can provide information of the surrounding structures, and thus the beam projection apparatus 100 of the present invention may include one or both of them.

The 3-dimensional image data obtained by the camera 110 photographing the surrounding structures is provided to the camera image processor 142. The camera image processor 142 is operable to pre-process the provided 3-dimensional image data.

Figure 3A:
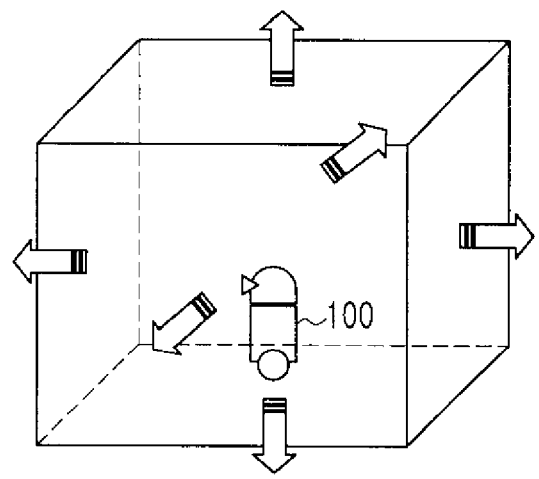
FIG. 3a schematically illustrates a beam projection apparatus with automatic image adjustment according to an exemplary embodiment of the present invention, which is searching surrounding structures to select a plane portion of the surrounding structures.
Figure 3B:
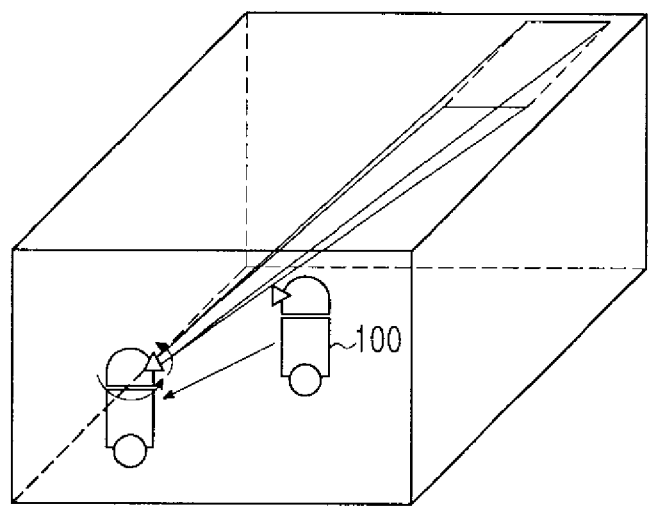
FIG. 3b schematically illustrates the beam projection apparatus with automatic image adjustment according to an exemplary embodiment of the present invention, which is projecting image beams on the selected plane portion of the surrounding structures.

The actuator module control unit 143 is operable to control the operations of the respective components of the actuator module 130 mentioned above. That is, the camera actuator 131, the moving unit 132, the focus adjustment unit 134, and the beam projector actuator 133 are under the control of the actuator module control unit 143. First, the actuator module control unit 143 controls the camera actuator 131 to change and adjust a direction and an angle of the lens of the camera 110. FIG. 3a schematically illustrates the beam projection apparatus 100 of the present invention, which is photographing in all directions to select a plane portion of the surrounding structures. And the actuator module control unit 143 controls the beam projector actuator 133 to make the image beams projected from the beam projector 120 be perpendicularly incident on the screen. Then, the actuator module control unit 143 controls the focus adjustment unit 134 to change the position of the lens of the beam projector 120 for focusing. Here, one of the modes selected from the group consisting of the contrast detection mode, the infrared sensor mode, or the hybrid mode is used for focusing. Finally, the actuator module control unit 143 controls the moving unit 132 to move the beam projection apparatus 100 in needed directions and to needed locations. In more detail, by the moving unit 132 being controlled by the control module 140, the beam projection apparatus 100 is moved to a location that allows the image beams projected from the beam projector 120 to be incident on the whole selected plane portion, i.e., selected screen, of the surrounding structures and to a location at which a distance between the beam projection apparatus 100 and the selected plane portion of the surrounding structures is within a focusable range and at the same time the distance between the beam projection apparatus 100 and the selected plane portion of the surrounding structures is a maximum distance of the focusable range. This is to move the beam projection apparatus 100 to an optimum location for displaying images on the selected screen, in which the optimum location is calculated by using the 3-dimensional image data provided by one of from the camera 110 and the map information storage unit 141. As shown in FIG. 3b, after the beam projection apparatus 100 of the present invention is moved to select the plane portion of the surrounding structures, it projects image beams onto the selected plane portion of the surrounding structures. Among the locations calculated above, locations to which the robot cannot move because of obstacles are excluded. In addition, a position of the beam projector 120 is adjusted to accurately display images on the selected plane portion of the surrounding structures. This can be achieved by using one of the moving unit 132, the beam projector actuator 133, etc., and will provide a desired position of the beam projector 120.

Figure 4A:
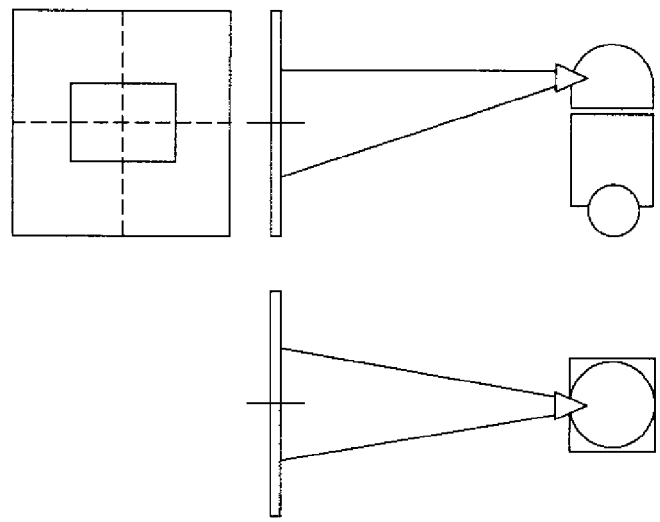
FIG. 4a is a schematic view illustrating a case where the beam projection apparatus with automatic image adjustment according to an exemplary embodiment of the present invention correctly displays images on the plane portion of the surrounding structures.
Figure 4B:
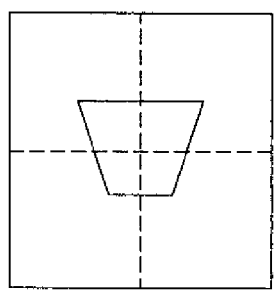
FIG. 4b is a schematic view illustrating cases where the beam projection apparatus with automatic image adjustment according to an exemplary embodiment of the present invention displays images with distortion.
Figure 4B:
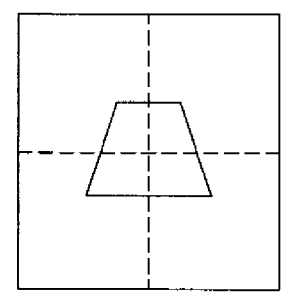
Figure 4B:
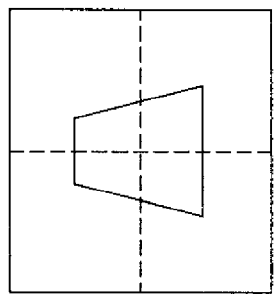
Figure 4B:
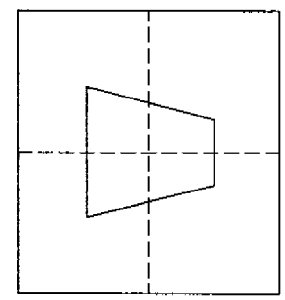
Figure 4C:
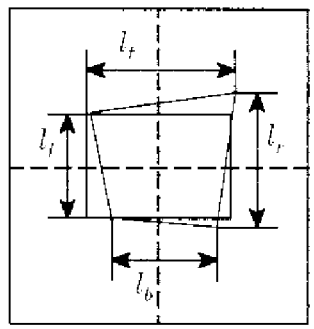
FIG. 4c is a view illustrating image distortion correction by the beam projection apparatus with automatic image adjustment according to an exemplary embodiment of the present invention.
Figure 4C:
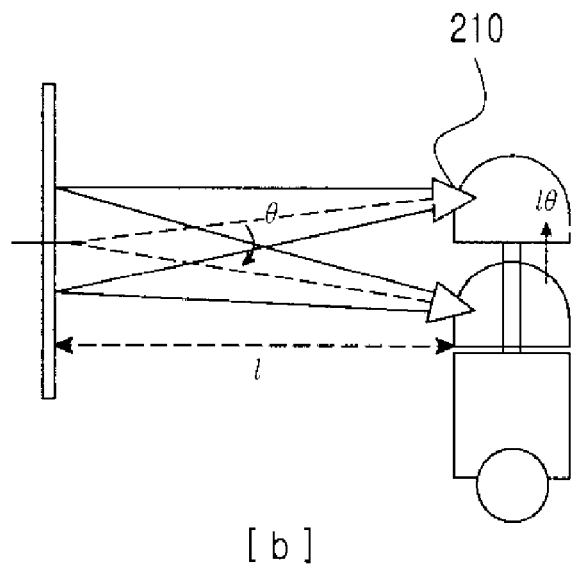
Figure 4C:
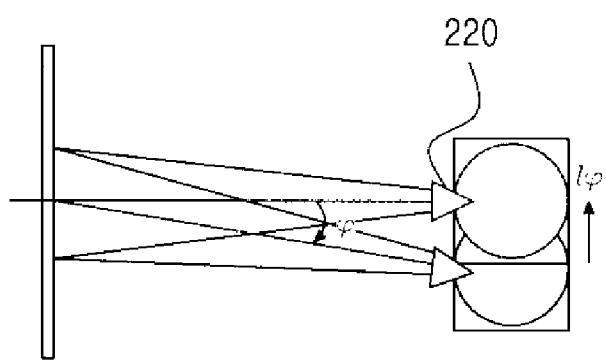

The images projected from the beam projector 120 should be correctly displayed, i.e., without distortion. FIG. 4a is a schematic view illustrating a case where the beam projection apparatus 100 correctly displays images on the plane portion of the surrounding structures, i.e., on the selected screen. In FIG. 4a, images in the shape of a square are correctly displayed. FIG. 4b is, however, a schematic view illustrating cases where the beam projection apparatus 100 displays images with distortion. This distortion of the images is generated by angles between the plane portion of the surrounding structures and the image beams incident thereon projected from the beam projector 120. In order to display correct images as shown in FIG. 4a, the image beams have to be perpendicularly incident on the plane portion of the surrounding structures. FIG. 4c is a view illustrating image distortion correction by the actuator module control unit 143 controlling the moving unit 132 and the beam projector actuator 133.

Referring to FIG. 4c, the present invention exhibits a calibration algorithm as below:

(1) Let l be the distance between the plane portion of the surrounding structures and the beam projection apparatus 100, and let $l_t$-$l_b$ be a ratio between lengths of a top end and a bottom end of the image. Then, an up/down angle difference between the beam projection apparatus 100 and the plane portion of the surrounding structures is calculated by equation (1) below, $$\theta = k_p l (l_t - l_b) \quad (1)$$

wherein $k_p$ is a proportional constant;

(2) The position of the beam projector is calibrated through the beam projector actuator 133 of the beam projection apparatus 100 so that the image beams of the beam projector are perpendicular to the plane portion of the surrounding structures, wherein the angle is corrected by $\theta$ and the height is corrected by $l\theta$;

(3) From the distance l between the plane portion of the surrounding structures and the beam projection apparatus 100 and a ratio $l_l$-$l_r$ between lengths of a left end and a right end of the image, a left/right angle difference between the beam projection apparatus 100 and the plane portion of the surrounding structures is calculated by equation (2) below, $$\phi = k_r l (l_l - l_r) \quad (2)$$

wherein $k_r$ is a proportional constant; and (4) The position of the beam projector is calibrated through the beam projector actuator 133 of the beam projection apparatus 100 so that the beams of the beam projector are perpendicular to the plane portion of the surrounding structures, wherein the angle is corrected by $\phi$ and the position in the left/right direction is corrected by $l\phi$.

Meanwhile, the 3-dimensional image data from one of the camera 110 and the map information storage unit 141 is provided to the screen selecting and detecting unit 144. The screen selecting and detecting unit 144 is operable to select a plane portion of the surrounding structures by using the 3-dimensional image data provided from the camera 110 or the map information storage unit 141, to set the selected plane portion of the surrounding structures as the screen which the beams are to be projected onto, and to inspect the conditions of the set screen including a color and a surface thereof.

The present invention defines the screen for optimum image display and provides an algorithm for selecting a plane portion with a suitable size from the surrounding structures. In this description of the present invention, the screen for optimum image display is defined as "a widest plane among planes each of which is a quadrangle with a single color and without unevenness or a pattern." Here, "a ratio between a base and height of the screen should be the same as that of the images projected from the beam projector 120."

Hereinafter, a plurality of mathematical models is provided for obtaining "the planes each of which is a quadrangle with a single color and without unevenness or a pattern." In order to obtain such a screen, (1) a plane in the shape of a quadrangle should have a dispersion value for an image value therein, which is, less than a predetermined threshold value. This is because a single color, such as black or white, has a dispersion value of zero. For another mathematical model, (2) when an image value on a plane in the shape of a quadrangle is subjected to Fast Fourier Transform, a sum of high frequency components should be less than a predetermined threshold value. This is because Fast Fourier Transform value has a low frequency of zero when a color of the plane is a single color. For another mathematical model, (3) when an image on a plane in the shape of a quadrangle is detected by an edge detector, any edge should not be detected. When a plane satisfies at least one of the above mathematical models, it can be selected as the optimum screen.

In addition, such an optimum screen should meet the condition, "a ratio between a base and height of the screen should be the same as that of the images projected thereon from the beam projector 120." Since images to be displayed on a screen are quadrangles with constant ratios according to corresponding beam projectors, the plane portion of the surrounding structures can be selected as the optimum screen when the ratio between lengths of its base and height are the same as that of images displayed thereon. Thus, the present invention employs an algorithm, which is as follows:

(1) First, white light is projected onto each of the surrounding structures by using the beam projector 120. The projected white light is then photographed by the camera 110 to obtain image data. The image data is used to detect conditions of the structures on which the white light is projected; (2) Then, a plane portion on which the white light is projected is divided into a number of small windows. This is shown in FIG. 5. FIG. 5 is a view illustrating an exemplary method for selecting a plane portion of the surrounding structures. As shown in FIG. 5, all the small windows 510 are designed to have a constant ratio n×m between its base and height so that all the small windows have a constant size. The ratio n×m is the same as the ratio (n×m) between the base and the height of the image displayed by the beam projector 120; (3) Here, a value of 1 is given to each window that is evaluated using the image data of each window 510 obtained from the camera 110 as the optimum screen based on the screen definition of the present invention. And a value of 0 is given to each window that is not so; (4) Then, when the value of a current window 520 is not 0, the value of the window 520 is compared with the values of windows above, below, left, and right of the current window 520; (5) As a result of the comparison, when the values of all the surrounding windows are either more than or the same as the value of the current window 520, the value of the current window is increased by 1; (6) The steps (4) and (5) are repeated until the values of all the windows are not increased any more; (7) Then, a distance from a window 520 with the highest value to the nearest window among windows with the value of 1 located in up/down/left/right directions of the window with the highest value; and (8) an area 530 at the distance obtained in (7) above in the respective directions from the window with the highest value is set as the screen in the end.

Finally, the image color calibration unit 145 calibrates the image color combination with reference to the conditions of the screen so that any pattern in the screen is not shown. The present invention employs an algorithm to calibrate the image color, which is as follows:

(1) First, white light is projected onto the screen by using the beam projector 120; (2) image data of the screen is obtained through the camera 110, and then a background color and pattern colors of the screen are detected. Here, components of the background color can be expressed by $(R, G, B)=(r_b, g_b, b_b)$, and the components of the pattern colors can be expressed by $(R, G, B)=(r_m, g_m, b_m)$; and (3) The colors of the images corresponding to the patterns and the not show the patterns, all the colors of the images corresponding to the patterns are obtained by equation (3) below.

$$(R, G, B)=(r_t, g_t, b_t)=(\min(r_m, r_b), \min(g_m, g_b), \min(b_m, b_b)) \qquad (3)$$

Then, images defined by equation (4) below are projected on portions corresponding to the patterns so as to correct the colors of the patterns.

$$(R, G, B)=(\min(r_m, r_t), \min(g_m, g_t), \min(b_m, b_t)) \qquad (4)$$

An image defined by equation (5) below is projected on a portion corresponding to the background so as to correct the color of the background.

$$(R, G, B)=(\min(r_b, r_t), \min(g_b, g_t), \min(b_b, b_t)) \qquad (5)$$

Exceptionally, step (3) is not applied when the colors of the patterns are black. Since the min value of black is zero, it is impossible to prevent the patterns with a black color from being shown while allowing the images to be shown.

Figure 6:
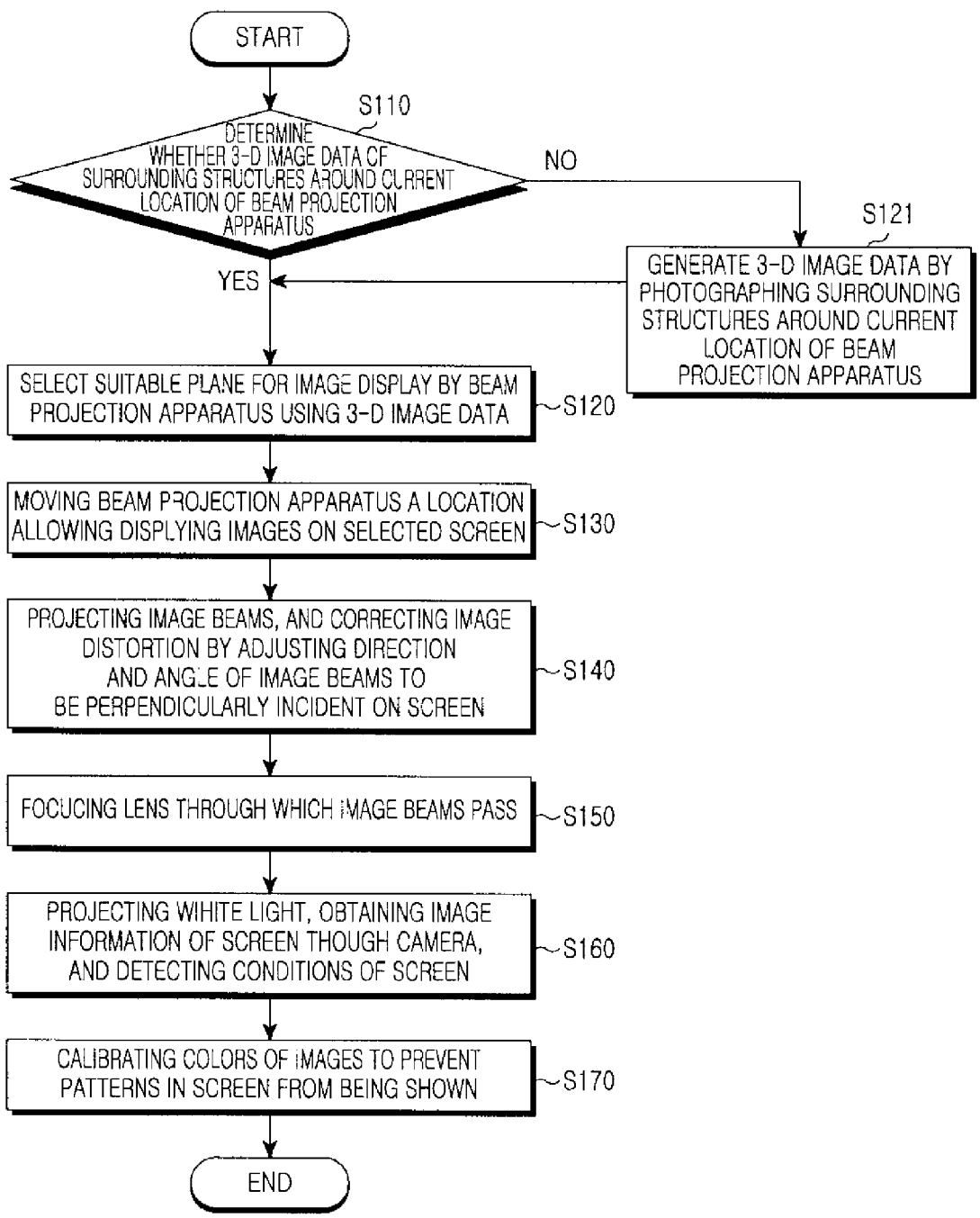
FIG. 6 is a flowchart illustrating a beam projection method with automatic image adjustment according to an exemplary embodiment of the present invention.

The present invention provides a beam projection method with automatic image adjustment. FIG. 6 is a flowchart illustrating the beam projection method with automatic image adjustment according to an exemplary embodiment of the present invention. Referring to FIG. 6, the beam projection method of the present invention includes the following steps.

First, it is determined whether or not the 3-dimensional image data of the surrounding structures at the current location of the beam projection apparatus 100 is being stored in the map information storage unit 141 (S110). When such data is not stored in the map information storage unit 141, the surrounding structures are photographed by using the camera 110 and the 3-dimensional image data thereof is generated (S121). The 3-dimensional image data is then sent to the camera image processor 142 of the control module 140 and pre-processed by the camera image processor 142. When it is determined that the 3-dimensional image data of the surrounding structures is being stored in the map information storage unit 141 at S110 above, the stored 3-dimensional image data or the 3-dimensional image data obtained through the camera 110 is sent to the screen selecting and detecting unit 144 of the control module 140. The screen selecting and detecting unit 144 finds and selects the most suitable plane for image display by the beam projector, and sets the selected plane as the optimum screen (S120). Here, the optimum screen (hereinafter 'screen') is the same as that of the description of the beam projection apparatus 100 mentioned above. In addition, the algorithm for finding the optimum screen is as mentioned above. Meanwhile, the beam projection apparatus 100 is moved to the location where it can accurately project images on the screen (S130). Here, the algorithm for controlling the moving unit 132 of the actuator module 130 for the most suitable location is the same as that of the description of the beam projection apparatus 100. In order to prevent image distortion, the direction and the angle of the image beams are adjusted to be perpendicularly incident on the screen by controlling the beam projector actuator 133 at the location (S140). In addition, the algorithm for correcting image distortion is the same as that of the description of the beam projection apparatus 100 mentioned above. The focus of the lens is then adjusted through the focus adjustment unit 134 (S150). As mentioned above, one of the contrast detection mode, the infrared sensor mode, and the hybrid mode may be used for focusing by the focus adjustment unit 134. The white light is then projected through the beam projector 120 on the screen, the image information of the screen is obtained by using the camera 110, and the conditions of the screen, such as the pattern or colors, is detected (S160). The colors of the images are calibrated by the image color calibration unit 145 so as to prevent the patterns of the screen from being shown (S170). Here, the algorithm for calibrating the colors of the images is the same as that of the description of the beam projection apparatus 100 of the present invention.

As described above, the present invention has advantages in that the optimum screen for image display is automatically searched for and selected from the surrounding structures, and the image distortion on the selected screen is then automatically corrected. Therefore, images can be easily displayed on the screen selected from the surrounding structures even though there is not a conventional screen and, furthermore, even though the selected screen is not white.

Especially, the focus adjustment and the color calibration according to the condition of the screen can be automatically performed, thereby providing optimum images to the user.

Although the features and elements of the present invention are described in the exemplary embodiments in particular combinations, those skilled in the art will realize that other combinations and modifications to these features and elements are possible without departing from the spirit or scope of the general inventive concept as defined by the appended claims and their equivalents.

What is claimed is:

1. A mobile apparatus for projecting an image, comprising:
   an actuator module being operable to move the mobile apparatus,
   a beam projector being operable to project images; and
   a control module being operable to:
      search a plurality of surrounding structures around the mobile apparatus by using an image data of the plurality of surrounding structures,
      select one of plane portions of the plurality of surrounding structures by using image of the plurality of surrounding structures,
      control the actuator module to move the beam projection apparatus for image display on the selected plane portion,
      control the beam projector to project the images portion, and
      control the beam projector to project the images on the selected plane portion.

2. The mobile apparatus according to claim 1, wherein the selected plane portion is a widest plane among planes of quadrangle with single color except for black and without a pattern.

3. The mobile apparatus according to claim 2, wherein the selected plane satisfies at least one of the following conditions;
   (1) a color dispersion value of color of the selected plane portion is 0 or less than a predetermined value;
   (2) when image data of the selected plane portion is subjected to Fast Fourier Transform, a sum of high frequency components is more than 0 and less than a predetermined value; and
   (3) when being detected by an Edge Detector, the selected plane portion does not include any edge.

4. The mobile apparatus according to claim 1, further comprising a camera operable to:
   photograph the surrounding structures around the beam projection apparatus, and
   provide a 3-dimensional image data generated from the photographing to the control module.

5. The mobile apparatus according to claim 4, wherein the control module comprises:
   a camera image processor operable to pre-process the 3-dimensional images provided from the camera.

6. The mobile apparatus according to claim 1, wherein the control module further comprises:
   a map information storage unit operable to store the 3-dimensional image data of the at least one surrounding structure around the beam projection apparatus.

7. The mobile apparatus according to claim 5, wherein the control module further comprises:
   a screen selecting and detecting unit operable to select the plane portion of the at least one surrounding structure by using the 3-dimensional image data and to detect the condition of the selected plane portion.

8. The mobile apparatus according to claim 1, wherein the actuator comprises:
   a moving unit operable to move the beam projection apparatus, wherein the actuator module further comprises:
      an actuator module control unit operable to control the moving unit to move the beam projection apparatus to a location that allows projected image beams to be incident on the whole selected plane portion, the location being at a maximum distance of a focusable range from the selected plane portion.

9. The mobile apparatus according to claim 8, wherein the actuator module further comprises:
   a beam projector operable to adjust a direction and an angle of projected beams to be incident on the selected plane portion, wherein the actuator module control unit is further operable to control the beam protector actuator to make the projected beams be perpendicularly incident on the selected plane portion.

10. The mobile apparatus according to claim 9, wherein the actuator module further comprises:
    a focus adjustment unit operable to focus a lens of the beam projector by changing a position of the lens, wherein the actuator module control unit is further operable to control the focusing of the lens by using a mode selected from the group consisting of a contrast detection mode, an infrared sensor mode, an infrared sensor mode, and a hybrid mode.

11. The mobile apparatus according to claim 10, wherein the control module further comprises:
    an image color calibration unit operable to calibrate colors of the images with reference to conditions of the selected plane portion detected by the screen selecting and detecting unit so that patterns in the selected plane portion are not shown.

12. The mobile apparatus according to claim 11, wherein the camera comprises a camera actuator operable to change a direction and an angle of the tens of the camera, wherein the actuator module control unit is further operable to control the camera actuator to change the direction and the angle of the lens.

13. A method for projecting an image using a mobile apparatus, comprising:
    searching a plurality of surrounding structures by using an image data of the plurality of surrounding structures;
    selecting one of plane portions of the plurality of surrounding structures by using the image data of the plurality of surrounding structures and moving to a location that allows displaying images on the selected plane portion;
    adjusting a direction and an angle of an image beams projected onto the selected plane portion;
    focusing a lens through which the projected image beams pass; and
    detecting the selected plane portion and calibrating colors of the detected images thereof.

14. The method according to claim 13 wherein the selected plane portion is a widest plane among planes of quadrangle with single color except for black and without a pattern.

15. The method according to claim 14, wherein the selected plane portion satisfies at least one of the following conditions:
    (1) a color dispersion value of a color of the selected plane portion is 0 or less than a predetermined value;
    (2) when image data of the selected plane portion is subjected to Fast Fourier Transform, a sum of high frequency components is more than 0 and less than a predetermined value; and (3) when the selected plane portion is detected by an Edge Detector, no edge is detected thereby.

16. The method according to claim 13, wherein searching the at least one surrounding structure is performed with reference to at least one of: 3-dimensional image data obtained by photographing and 3-dimensional image data already stored.

17. The method according to claim 13, wherein moving to a location that allows displaying is performed by moving to a location that allows projected image beams to be incident on the whole selected plane portion, the location being at a maximum distance of a focusable range from the selected plane portion.

18. The method according to claim 13, wherein adjusting direction and an angle of an image beams is performed by adjusting a direction and an angle of an image beams such that the image beams are perpendicularly incident on the selected plane potion.

19. The method according to claim 13, wherein focusing is performed by using one of: a contrast detection mode, an infrared sensor made, and a hybrid mode.

20. The method according to claim 13, wherein calibrating colors of the images is performed such that patterns in the selected plane portion are not shown.

21. The mobile apparatus according to claim 1, wherein the selected plane portion has a ratio between base and height substantially the same as that of the image projected.

\* \* \* \* \*